(12) United States Patent
Reisen et al.

(10) Patent No.: US 11,427,677 B2
(45) Date of Patent: Aug. 30, 2022

(54) PROCESS AND APPARATUS FOR PREPARING BIODEGRADABLE POLYESTERS

(71) Applicant: TECHNIP ZIMMER GMBH, Frankfurt am Main (DE)

(72) Inventors: Michael Reisen, Frankfurt am Main (DE); Rainer Linke, Butzbach (DE); Eckhard Seidel, Frankfurt am Main (DE); Reza Sarbandi, Frankfurt am Main (DE)

(73) Assignee: TECHNIP ZIMMER GMBH, Frankfurt am Main (DE)

( * ) Notice: Subject to any disclaimer, the term of this patent is extended or adjusted under 35 U.S.C. 154(b) by 154 days.

(21) Appl. No.: 16/626,066

(22) PCT Filed: Jul. 6, 2017

(86) PCT No.: PCT/EP2017/067034
§ 371 (c)(1),
(2) Date: Dec. 23, 2019

(87) PCT Pub. No.: WO2019/007523
PCT Pub. Date: Jan. 10, 2019

(65) Prior Publication Data
US 2020/0223980 A1    Jul. 16, 2020

(51) Int. Cl.
*C08G 63/78* (2006.01)
*B01J 19/00* (2006.01)
(Continued)

(52) U.S. Cl.
CPC ........ *C08G 63/785* (2013.01); *B01J 19/0006* (2013.01); *B01J 19/06* (2013.01);
(Continued)

(58) Field of Classification Search
USPC .......................................................... 528/302
See application file for complete search history.

(56) References Cited

U.S. PATENT DOCUMENTS 3,591,344 A * 7/1971 Schnock et al. .......... B01F 7/04
422/135
6,103,859 A * 8/2000 Jernigan ............... C08G 63/183
526/65
(Continued)

FOREIGN PATENT DOCUMENTS

CN    102453238    5/2012
EP    1 106 640 A2    6/2001
(Continued)

OTHER PUBLICATIONS

Machine translation of Detailed Description of CN 102453238A, retrieved from Espacenet on Jan. 3, 2022. (Year: 2012).*
(Continued)

*Primary Examiner* — Fred M Teskin
(74) *Attorney, Agent, or Firm* — Lott & Fischer, PL

(57) ABSTRACT

There is described a process for preparing a biodegradable polyester from an aromatic dicarboxylic acid, an aliphatic dicarboxylic acid and a diol where in a first reaction step the aromatic acid is esterified with the diol, and in a second reaction step the aliphatic acid is added to the reaction mixture. Furthermore, there is described an apparatus for carrying out this process.

10 Claims, 1 Drawing Sheet

(51) Int. Cl.
  *B01J 19/24*   (2006.01)
  *C08G 63/183*  (2006.01)
  *B01J 19/06*   (2006.01)

(52) U.S. Cl.
  CPC ............ *B01J 19/24* (2013.01); *C08G 63/183* (2013.01); *B01J 2219/00162* (2013.01)

(56) References Cited

U.S. PATENT DOCUMENTS

| | | | |
|---|---|---|---|
| 6,713,595 | B2 | 3/2004 | Chung et al. |
| 2006/0155099 | A1 | 7/2006 | Wu et al. |
| 2015/0065678 | A1 | 3/2015 | Hess et al. |
| 2015/0158974 | A1 | 6/2015 | Chun et al. |

FOREIGN PATENT DOCUMENTS

| | | |
|---|---|---|
| EP | 2 894 182 A1 | 7/2015 |
| EP | 2894182 A1 | 7/2015 |
| JP | A-2001-187818 | 7/2001 |
| JP | T-2011-518941 | 7/2011 |
| JP | 2015-500379 | 1/2015 |
| KR | 1020010055721 A | 7/2001 |
| KR | 1020140123476 | 10/2014 |
| WO | 2007098637 | 9/2007 |

OTHER PUBLICATIONS

ISA/EP—Written Opinion of the International Search Authority—International Application No. PCT/EP2017/067034.
Japanese Office Action dated Jan. 26, 2021.
European Patent Office—Office Action dated Nov. 23, 2020 (European Patent Application No. 17 735 556.7-1107).
Korean Office Action dated Jun. 21, 2021.
Indian First Examination Report dated Jun. 29, 2021.
Japanese Office Action dated Sep. 28, 2021.
Korean Patent Office—Korean Notice of Preliminary Rejection dated Nov. 23, 2021.
Chinese Patent Office—Chinese Office Action dated Oct. 9, 2021.
Chinese Office Action dated Apr. 21, 2022—Chinese Patent Application No. 201780092925.5.

* cited by examiner

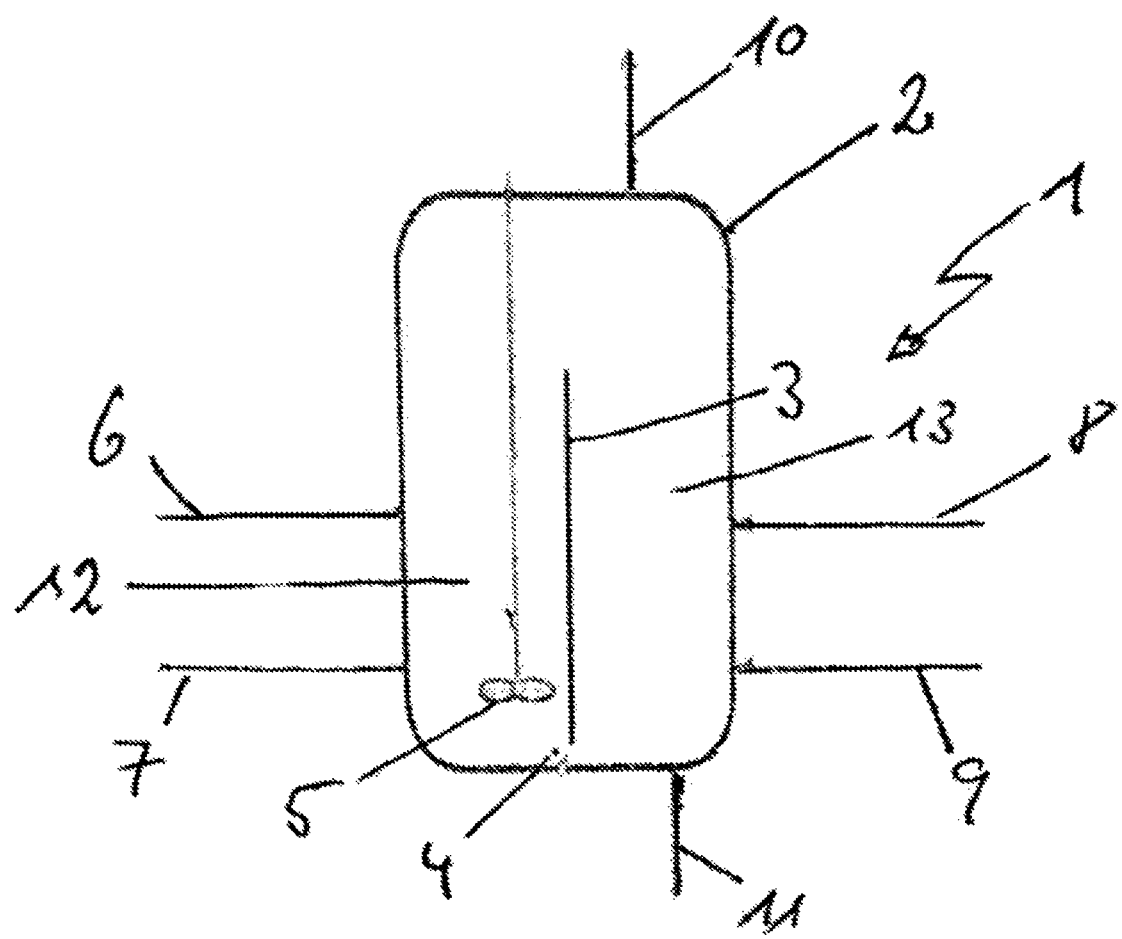

PROCESS AND APPARATUS FOR PREPARING BIODEGRADABLE POLYESTERS

This application is a national phase of PCT Application No. PCT/EP2017/067034 filed Jul. 6, 2017, the contents of which are hereby incorporated by reference.

The present invention relates to a process for preparing a biodegradable polyester and an apparatus with which in particular this process can be carried out.

Biodegradable polyesters are based on esterification and subsequent polycondensation of aliphatic dicarboxylic acids or a mixture of aliphatic and aromatic dicarboxylic acids reacting with diols.

Commercial examples are polybutylene-succinate (PBS), based on succinic acid and butanediol, or polybutylene-adipate-terephthalate (PBAT), based on adipic acid, terephthalic acid and butanediol.

During the common esterification of aliphatic and aromatic acids, as described in EP2268702, EP1882712, or EP2725048 usually the reaction of the aliphatic acid is preferred due to the lower melting point and better solubility. The reaction of the aromatic acid starts usually only at higher temperatures. Feeding the aromatic acid step wise into the esterification product of the aliphatic acid, as described in EP 2881415, is difficult to be realized in a continuous process and requires a high effort for controlling and dosing the mixture of diol and the aromatic acid being usually prepared as slurry of the solid acid in diol. Preparing two esterification products or even two prepolycondensation products as in CN102443149 by separately reacting the aromatic acid with diol and the aliphatic acid with diol may lower the ether or THF production but requires at least two fully equipped reactors for the esterification.

Based on the lower solubility of the aromatic compound the acid remains longer in the esterification product and may result in side reactions as ether or THF (tetrahydrofuran) formation. In order to improve reaction speed, the temperature or the surplus of diol could be raised, but also this leads to higher side reactions, and the higher temperature may result in decomposition of the aliphatic component as well as in a higher oligomer content in the vapors leaving the reactor due to the lower boiling point of the aliphatic component. The higher surplus of diol also requires higher energy input to finally vaporize this surplus. The side reactions may result in a discoloration of the final product.

Therefore, the technical problem underlying the present invention is to provide a process and an apparatus for preparing biodegradable polyesters avoiding the above problems. In particular, less side reactions, a better process control, better quality of the obtained polyester and a lower energy consumption is to be achieved.

This object has been achieved by the process according to the present invention for preparing a biodegradable polyester from an aromatic dicarboxylic acid, an aliphatic dicarboxylic acid and a diol where
- in a first reaction step the aromatic acid is esterified with the diol, and
- in a second reaction step the aliphatic acid optionally together with further diol is added to the reaction mixture.

According to the present invention, the reaction is carried out by a first and a second reaction step. That means that the first and the second reaction step can be distinguished from each other for example in that the reaction is carried out in different reaction vessels and/or in that the reaction conditions are different.

In the first reaction step, the molar ratio of diol to aromatic acid is 1.1-3.0. In the second reaction step, the molar ratio of diol to aliphatic acid is 0.9-2.5.

Examples of the aliphatic dicarboxylic acids are linear acids having a molecular formula $C_nH_{2(n-1)}O_4$ with n equal to or smaller 40 such as oxalic-, malonic-, succinic-, glutaric-, adipinic-, or pimelic-acid, but also dimeric acids or dicarboxylic acids having a cyclic ring as cyclohexane dicarboxylic acid. Also the (in particular methyl-, ethyl-, propyl- or butylic) ester of these acids as well as the acid anhydrides (e.g. succinic acid anhydride) can be employed. These acids can be used as single compound or as mixture of two or more compounds.

As aromatic acids can be used e.g. terephthalic acid, isophthalic acid, 2,6-naphtalenedicarboxylic acid but also acids having a furan ring e.g. furandicarboxylic acid as well as their respective (in particular methyl-, ethyl-, propyl- or butylic) ester. These acids can be used as single compound or as a mixture of two or more compounds.

As diol aliphatic or alicyclic compounds having two —OH groups can be used. Preferred are aliphatic diols with 2-10 carbon atoms, e.g. ethyleneglycol, 1,3-propanediol, 1,4-butanediol, neopentylglycol, 1,6-hexamethyleneglycol or 1,4-cyclohexanedimethanol. These diols can be used either single or as a mixture of two or more diols.

Catalysts can be used in both steps of the method according to the present invention. As catalyst known metals and organometallic compounds can be used. Preferred are titanium catalysts or organometallic titanium compounds (e.g. tetrabutyl-titanate).

To improve the elastic properties of the polymer polyols as e.g. polyethylene glycol, polypropylene glycol or polytetramethylene ether glycol having a molecular weight of 250-4000 g/mol can be added in a concentration of 0.01 40 mol-% (in particular 0.01-5 mol %) based on the total amount of acids and diols.

To improve or modify mechanical properties of the obtained polyester, a branching agent can be used. Examples are a tri- or higher valent alcohols (e.g. glycerol, pentaerythrit) or an appropriate trivalent acid (e.g. propane-1,2,3-tricarboxylic acid) and/or acid anhydrides (e.g. trimellitic acid anhydride) or a tri- or higher valent oxocarboxylic acid (like malic acid, citric acid, hydroxyisophthalic acid).

In the method according to the present invention, a stabilizer can be employed. As stabilizer a phosphorous compound can be used. Examples are phosphoric acid ($H_3PO_4$), triethylphosphonoacetate (TEPA), tris-tri-ethylene glycol phosphoric acid (TEGPA) or 3-phosphonopropionic acid (CEPA).

As mentioned above, first the aromatic acid reacts with the diol to an esterification product and will be then subsequently mixed with the aliphatic acid and the required additional amount of diol. This permits a fast reaction of the aromatic component under optimized conditions. Adding the aliphatic acid allows also a fast reaction of the aliphatic component under reaction conditions optimized for this reaction step.

In one embodiment, the aliphatic acid is added in a molten state and/or dissolved in diol in order to start esterification reaction without hindrance by solubility and at a possibly lower reaction temperature.

In one embodiment, the production of the biodegradable polyester can be batch wise or continuous. Batch production is suited for small capacities; a fast switch of recipes allows the production of many specialties. The continuous production allows the economical production of high capacities of a base grade polymer to be adapted for individual applications by extrusion.

Hereinafter, the continuous process and the batch process are described in detail.

Continuous Production:

Many of the aromatic dicarboxylic acids have a high melting point and are usually available as solid crystalline powder. Often this powder will be mixed with diol to form a pump able slurry (or paste) and will be fed as slurry into the first reaction stage.

The aliphatic dicarboxylic acids usually have a lower melting point and can be fed into the reactor directly in a molten form or as a liquid mixture dissolved or molten with diol. This has the advantage that melting/dissolving of the acid can be done for example with steam instead of the costlier energy from thermal oil.

The addition of the aliphatic acids to the esterified aromatic component can be done at a different pressure and/or temperature than the first reaction stage. It is preferred to keep the pressure equal to or lower than the pressure in the first reaction stage to avoid the installation of a pump. In particular, the pressure is kept equal. In this way the reaction stage can be simply divided into two compartments equipped with means to transfer the required heat, separated by a partition wall, where the product can flow from first compartment (step 1, aromatic esterification step) into the second compartment (step 2, aliphatic esterification step) can be realized by an overflow (fixed level in first stage) or a drain hole (common level control). The temperature in both compartments as well as the reflux of diol into each compartment can be individually controlled based on the reaction requirements.

The volatility of the aliphatic acid and their tendency to decompose can limit somehow the reaction conditions in the second esterification step e.g. pressure and temperature. It is suitable to keep the pressure in both compartments equal and to lower the temperature for the second step.

In order to reach the required conversion and to separate the surplus of diol a subsequent esterification step at reduced pressure and possibly increased temperature may be required.

The vapors of the esterification stages optionally together with the diol split of during prepolycondensation and polycondensation can be separated in a common process column. The diol leaves the column sump and the required amount will be fed back into the esterification stages allowing together with level, temperature and pressure adjustment an optimum of process control with respect to conversion and quality. The remaining diol from the column sump can be used to prepare the slurry of the aromatic component. The column overhead product contains mainly the water from the esterification and/or low boiling alcohols from a trans-esterification as well as other low boilers (e.g. acetic aldehyde, tetrahydrofuran).

Polyesters containing aliphatic dicarboxylic acids have usually a lower melting point than pure aromatic polyesters. This may lead to a lower processing temperature to reduce thermal degradation and decomposition. The lower processing temperature requires a lower pressure during prepolycondensation and polycondensation to split off the diol. In order to get an economical design of the reactor stages and the vacuum system the pressure can be reduced in several steps (e.g. three steps) down to the final pressure.

The final reaction step can be a reactor offering a high polymer surface and an active surface renewal to support the mass transfer limited evaporation of the split products as diol and water. Example of such reactors are a disc ring reactor or a disc cage reactor or similar reactors (e.g. EP1830953 or EP2180987). In order to improve the surface renewal and to wipe and clean the film forming rotating elements special stators (e.g. EP 1824587) can be used.

Batch Production:

In a batch production the reactor can be filled with diol and the aromatic acid, and the slurry can be heated up to start the reaction at an appropriate pressure. With the aid of a separation unit on top of the reactor the low boiling split products of the (trans-) esterification reaction (e.g. low boiling alcohol or water) can be withdrawn while the diol is refluxed into the reactor. During the reaction the temperature rises and the pressure will be reduced slowly to facilitate the evaporation of the low boilers. After reaching a predefined conversion of the aromatic component the aliphatic dicarboxylic acid together with the required amount of diol can be added to the reaction mixture, and the esterification of the aliphatic component is done at the same or a reduced temperature and pressure. After reaching the required conversion, the pressure can be further reduced while keeping or slightly increasing the temperature and splitting off surplus diol until the final viscosity is reached.

Another target of this process is to produce in the same plant co-polyester from aromatic and aliphatic components as well as also aromatic or aliphatic polyesters in order to increase production flexibility allowing a quick reaction on the market situation.

In one embodiment of the process according to the present invention, the pressure for the second esterification step is equal to or lower than the pressure for the first esterification step.

Furthermore, in one embodiment of the process according to the present invention, the temperature of the second esterification step is equal to or lower than the temperature for the first esterification step.

In another embodiment of the process of the present invention, the product of the second esterification step can enter an additional esterification step operated at lower pressure and at an equal to or higher temperature than the previous step.

In a further embodiment of the process according to the present invention, the product can enter a prepolycondensation step operated at lower pressure and at an equal to or higher temperature than the previous esterification step.

In a still further embodiment of the process according to the present invention, the product can enter a second prepolycondensation step operated at lower pressure and at an equal to or higher temperature than the previous prepolycondensation step.

In one embodiment of the process according to the present invention, the product can enter a polycondensation step operated at lower pressure and at an equal to or higher temperature than the previous prepolycondensation step.

In the process according the present invention, in the polycondensation step a reactor providing a high polymer surface and an active surface renewal is used, as e.g. a disc ring reactor or a disc cage reactor.

Furthermore, the present invention provides an apparatus adapted to perform the process according to the present invention as described above in detail, where the apparatus is adapted to adjust the pressure for both reaction steps to be equal.

In one embodiment, the apparatus according to the present invention can be divided into two compartments, where the two compartments can have a common level control and/or can be connected by a drain hole.

In the following the invention will be illustrated and further explained by reference to the FIGURE and the examples wherein it is to be noted that the FIGURE and examples shall not be considered as restriction of the invention thereto.

The FIGURE shows an apparatus suitable for carrying out the process for preparing the biodegradable polyester.

As shown in the FIGURE, the apparatus 1 for preparing a biodegradable polyester comprises a reaction vessel 2 equipped with a partition wall 3 to divide the reaction vessel 2 in a first reaction zone 12 and a second reaction zone 13 for carrying out the first and the second reaction step, respectively, separately. Furthermore, at the bottom there is provided a drain hole 4 which provides a passage through the partition wall 3 between the two reaction zones 12 and 13. The apparatus 1 is further equipped with a stirrer 5 which is provided in the first reaction zone 12 in which the first reaction step is carried out. Furthermore, there is provided an inlet for aromatic acid 6, and an inlet for the dial 7 to feed these compounds into the first reaction zone 12. Moreover, there is provided an inlet for the aliphatic acid 8, and an inlet for the dial 9 to feed these compounds into the second reaction zone 13. The apparatus 1 is also equipped with an outlet for vapor 10 which is provided at the top of the reaction vessel 2 and an outlet for the esterification product 11, which is provided at the bottom of the reaction vessel 2.

EXAMPLES

Example 1 shows the inventive process using a 10 l-reactor as well for TPA as for adipic acid.
Esterification:
Recipe:
  1385.1 g TPA (Terephthalic acid)
  1051.9 g BD (Butanediol, molar ratio BD to TPA=1.4)
  1.554 g Tyzor TnBT catalyst (Dorf Ketal) to the monomers (60 ppm Ti related to final polymer)
  47.4 g Polyethylene glycol 400 (PEG 400), (13 kg/to)
  2.55 g Pentaerythritol, (0.7 kg/to)
Esterification of TPA After filling the monomers and the catalyst into the reactor, the reactor has been flushed with nitrogen. The reaction mixture was heated up under continuous stirring. When the product temperature reached 195° C. (start of time measurement), the pressure was reduced within 15 min to 400 mbar (abs) while product temperature increased further to 245° C. The esterification was finished after 120 min.
Preparation of Adipic Acid Solution in BD
Recipe:
  1319.5 g adipic acid
  789.3 g BD (molar ratio BD to adipic acid=0.97; resulting molar ratio of BD to both acids=1.176)
Preparation of Solution BD was filled in to the preparation vessel and afterwards adipic acid was added. The preparation vessel was rendered inert by nitrogen. The mixture was heated up to 160° C. under slight overpressure and stirred until the TPA esterification was finished. During this time, the adipic acid dissolved in BD.
Continuation of Esterification The adipic acid-BD-solution was fed into the esterification reactor within approximately 5 min.

The product temperature, as result of the feed and a reduction of the heating temperature, dropped to 182° C. and increased in the ongoing esterification to 212° C. The condensate yield indicated the targeted end of esterification reaction after a total of 160 min after start of time measurement (40 minutes after adding of adipic acid solution).
Addition of Phosphorus Component An amount of 1.583 g Triethyl phosphonoacetat (TEPA) (60 ppm P related to final polymer) was added and prepolycondensation was started.
Prepolycondensation The condensing system was switched from esterification condenser to prepolycondensation cooling traps and the pressure was reduced to 150 mbar within 5 min and further on to 35 mbar within another 5 min. At this target pressure the reaction continued for 10 min. The melt temperature averaged at 236° C.

The overall prepolycondensation time was 20 min.
Addition of Polycondensation Catalyst An amount of 2.07 g Tyzor TnBT catalyst (Dorf Ketal), (80 ppm Ti related to final polymer) was fed afterward and post-flashed with 10 g BD into reactor.
Polycondensation The condensing system was switched from prepolycondensation cooling traps to polycondensation cooling traps. The pressure was reduced within 15 min to <1 mbar. The temperature during polycondensation was 240° C. The total polycondensation time was 380 min. After breaking the vacuum with nitrogen, the polymer was discharged by pressure and granulated. The intrinsic viscosity of the final polymer product was 1.580 dl/g.

Example 2 shows the inventive process using a 10 l-reactor as well for TPA as for adipic acid.
Esterification:
Recipe:
  1385.1 g TPA
  1051.9 g BD (molar ratio BD to TPA=1.4)
  1.554 g Tyzor TnBT catalyst (Dorf Ketal) to the monomers (60 ppm Ti related to final polymer)
  47.4 g Polyethylene glycol 400 (PEG 400), (13 kg/to)
  2.55 g Pentaerythritol, (0.7 kg/to)
Esterification of PTA After filling the monomers and the catalyst into the reactor, the reactor has been flushed with Nitrogen. The reaction mixture was heated up under continuous stirring. When the product temperature reached 195° C. (start of time measurement), the pressure was reduced within 15 min to 400 mbar (abs) while product temperature increased further to 245° C. The esterification was finished after 120 min.
Preparation of Adipic Acid Solution in BD
Recipe:
  1319.5 g adipic acid
  764.9 g BD (molar ratio BD to adipic acid=0.94)
  Resulting molar ratio of both acids to BD: 1.161
Preparation of Solution BD was filled in to the preparation vessel and afterwards adipic acid was added. The preparation vessel was rendered inert by nitrogen. The mixture was heated up to 160° C. under slight overpressure and stirred until the TPA esterification was finished. During this time, the adipic acid dissolved in BD.
Continuation of Esterification The adipic acid-BD-solution was fed into the esterification reactor within approximately 10 min.

The product temperature, as result of the feed and a reduction of the heating temperature, dropped to 185° C. and increased in the ongoing esterification to 210° C. The condensate yield indicated the targeted end of esterification reaction after a total of 170 min after start of time measurement (50 minutes after adding of adipic acid solution).

Prepolycondensation

The condensing system was switched from esterification condenser to prepolycondensation cooling traps and the pressure was reduced to 150 mbar within 5 min and further on to 35 mbar within another 5 min. At this target pressure the reaction continued for 10 min. The melt temperature averaged at 236° C.

The overall prepolycondensation time was 20 min.

Addition of Polycondensation Catalyst

An amount of 2.07 g Tyzor TnBT catalyst (Dorf Ketal), (80 ppm Ti related to final polymer) was fed afterward and post-flashed with 10 g BD into reactor.

Polycondensation

The condensing system was switched from prepolycondensation cooling traps to polycondensation cooling traps. The pressure was reduced within 15 min to <1 mbar. The temperature during polycondensation was 240° C. The polycondensation time was 350 min. After breaking the vacuum with nitrogen, the polymer was discharged by pressure and granulated. The intrinsic viscosity of the final polymer product was 1.665 dl/g.

The invention claimed is:

1. A process for preparing a biodegradable polyester from an aromatic dicarboxylic acid, an aliphatic dicarboxylic acid and a diol where in a first reaction step the aromatic acid is esterified with the diol, and in a second reaction step the aliphatic acid is added to the reaction mixture, wherein in the second reaction step the aliphatic acid is added together with further diol to the reaction mixture wherein the aliphatic acid is added either in a molten state or as a paste or as an ester of the diol or dissolved in the diol.

2. The process according to claim 1, where the pressure for the second reaction step is equal to or lower than the pressure for the first reaction step.

3. The process according to claim 1, where the temperature for the second reaction step is equal to or lower than the temperature for the first reaction step.

4. The process according to claim 1, wherein the process is a batch process or a continuous process.

5. The process according to claim 1, where the product obtained in the second reaction step enters an additional esterification step operated at lower pressure and equal to or higher temperature than the second reaction step.

6. The process according to claim 1, where the product obtained in the second reaction step enters a first prepolycondensation step operated at lower pressure and equal to or higher temperature than the second reaction step.

7. The process according to claim 6, where the product obtained in the first prepolycondensation step enters a second prepolycondensation step operated at lower pressure and equal to or higher temperature than the first prepolycondensation step.

8. The process according to claim 5, where the product obtained in the additional esterification step enters a polycondensation step operated at lower pressure and equal to or higher temperature than the second reaction step.

9. The process according to claim 8, where in the polycondensation step a reactor providing a high polymer surface and/or an active surface renewal is used.

10. The process according to claim 9, wherein the reactor comprises a disc ring reactor or a disc cage reactor.

* * * * *